United States Patent [19]
Groves et al.

[11] 4,161,787
[45] Jul. 17, 1979

[54] PROGRAMMABLE TIMER MODULE COUPLED TO MICROPROCESSOR SYSTEM

[75] Inventors: Stanley E. Groves, Round Rock; Gene A. Schriber; Brian M. Spinks, both of Austin, all of Tex.; Richard M. Baker, Phoenix, Ariz.; Thomas C. Daly, Dallas, Tex.; Rodney J. Means, Manassas, Va.

[73] Assignee: Motorola, Inc., Schaumburg, Ill.

[21] Appl. No.: 848,558

[22] Filed: Nov. 4, 1977

[51] Int. Cl.² .............................................. G06F 9/18
[52] U.S. Cl. .................................. 364/900; 235/92 T
[58] Field of Search ... 364/200 MS File, 900 MS File; 324/181; 235/92 T, 92 MT, 92 TF; 328/129; 307/293

[56] References Cited

U.S. PATENT DOCUMENTS

| | | | |
|---|---|---|---|
| 3,434,115 | 3/1969 | Chomicki | 364/900 |
| 3,573,751 | 4/1971 | DeLisle | 364/900 |
| 3,742,463 | 6/1973 | Haselwood | 364/900 |
| 3,771,144 | 11/1973 | Belady et al. | 364/900 |
| 3,862,372 | 1/1975 | Deutsch | 364/900 |
| 3,891,973 | 6/1975 | Maxwell | 364/900 |
| 3,969,703 | 7/1976 | Kwiatkowski et al. | 364/900 |
| 4,024,510 | 5/1977 | Pearson | 364/900 |
| 4,025,768 | 5/1977 | Missios et al. | 364/900 |
| 4,034,352 | 7/1977 | Hotchkiss | 364/900 |
| 4,063,308 | 12/1977 | Collins et al. | 364/200 |

*Primary Examiner*—Mark E. Nusbaum
*Attorney, Agent, or Firm*—Anthony J. Sarli, Jr.

[57] ABSTRACT

A programmable timer module (PTM) is provided as a component of a microprocessor system in order to generate and measure varying time intervals under program control. The programmable timer module includes, in one embodiment, three independent 16-bit timers. Each timer includes a 16-bit counter and a 16-bit latch. The programmable timer module also includes an 8-bit status register and an 8-bit control register each of which may be coupled to an 8-bit bidirectional data bus of a microprocessor system. Selection circuitry is provided which permits the microprocessor to select either the control register or the status register. Information can be written into the control register; the operation is effected by means of read/write circuitry and a read/write input. Any one of the three timers can also be selected by means of the selection circuitry, and a 16-bit number can be written into the selected 16-bit latch. Reset circuitry resets the counter whenever the 16-bit latch is written into, and the counter counts until it reaches the number written into the 16-bit latch, whereupon the interrupt circuitry generates an interrupt signal and sets an appropriate interrupt bit in the status register, and also resets that counter. The counter continues counting at the appropriate clock rate after the interrupt so that time since the interrupt may be determined by the microprocessor. The outputs of the three counters can be selected as outputs of the programmable timer module.

9 Claims, 11 Drawing Figures

PROGRAMMABLE TIMER MODULE COUPLED TO MICROPROCESSOR SYSTEM

BACKGROUND OF THE INVENTION

1. Field of the Invention

The invention relates to programmable timing devices for microprocessor systems.

2. Brief Description of the Prior Art

Integrated circuit microprocessors, especially MOS LSI microprocessors, have recently been widely implemented on a single semiconductor chip at economical costs. Such integrated circuit microprocessor chips have provided the foundation for low cost microcomputers when combined with LSI interface adaptors and memory chips. For example, see Applicant's issued U.S. Pat. Nos. 3,962,682 "Split Low Order Internal Address Bus for Microprocessor"; 3,979,730 "Interface Adaptor Having Control Register"; 4,004,283 "Multiple Interrupt Microprocessor System", and 3,975,712 "Asynchronous Communication Interface Adaptor". Such systems provide great computing power at low cost, but thus far such systems have not provided a capability of conveniently generating programmable output waveforms or of measuring elapsed time intervals under program control or generating signals indicative of programmable time intervals.

SUMMARY OF THE INVENTION

It is an object of the invention to provide a programmable timer for interfacing with a bidirectional data bus and generating an interrupt signal when a predetermined count has been reached.

It is another object of the invention to provide a programmable timer circuit interfaceable with a bidirectional data bus for generating programmably controlled output waveforms.

Briefly described, the invention is a programmable timer device which may be coupled to a data bus, and which is responsive to a timing signal. The programmable timer module includes a latch circuit responsive to the data bus for receiving and storing a binary number received from the data bus, and also includes a counter responsive to the timing signal for counting at a rate determined by the timing signal. Circuitry is included to allow the counter to be preset to the binary number stored in the latches. Circuitry is coupled to the counter for generating an interrupt signal or a control signal in response to the time-out of the counter or in response to the gating signal. In one embodiment, circuitry is included for presetting the counter in response to the time-out. An output circuit responsive to the counter toggles in one direction in response to a time-out and toggles in the opposite direction in response to the next time-out. Another embodiment includes a second counter cascaded with the first counter and includes a second latch circuit for storing a second binary number. When the second counter times out the second counter is preset and continues counting, and the first counter is decremented. An output circuit responsive to the first and second counters toggles in one direction in response to a time out of the first counter and toggles in an opposite direction in response to the combination time out of the first and second counters.

In another embodiment of the programmable timer an 8-bit data bus must address the 16-bit timer directly using two separate cycles. Also, the counters are incrementers. The counters are reset at the start of a count and a match is obtained to set an interrupt flag when the count in the counters matches that which is stored in the respective timer latch.

DESCRIPTION OF A PREFERRED EMBODIMENT

Figure 1:
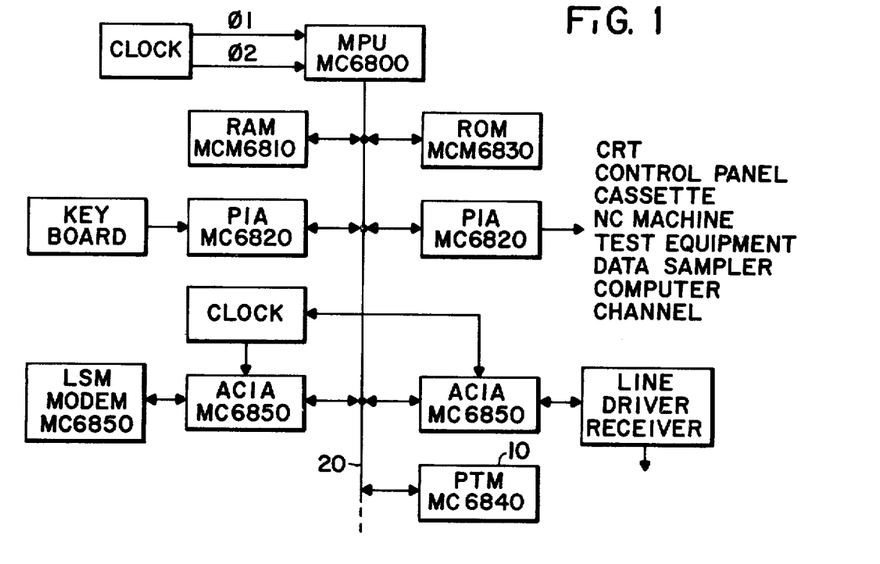
FIG. 1 is a block diagram illustrating a multi-chip microprocessor system which incorporates a programmable timer module according to the invention.

FIG. 1 is a block diagram of a microprocessor system incorporating a programmable timer according to the invention. Shown is a microprocessor device which may be an MC6800 microprocessor manufactured by Motorola Inc. Associated therewith is a clock module to provide the operating clock signals $\phi 1$ and $\phi 2$ to the processor. A bus 20 is shown to which may be connected a random access memory (MCM6810), a read-only-memory (MCM6830), two peripheral interface adaptors (PIA) which may be connected to various peripheral devices such as a keyboard, CRT, or the like. A pair of asynchronous communications interface adaptors (ACIA) are also shown connected to communications peripheral devices.

The programmable timer module (PTM) 10 is also shown connected to bus 20, which device incorporates the invention of the instant disclosure. The structure and operation of each of the components of FIG. 1, except for PTM 10 are well known and have been described in the patents noted above and in publicly available literature.

Figure 2:
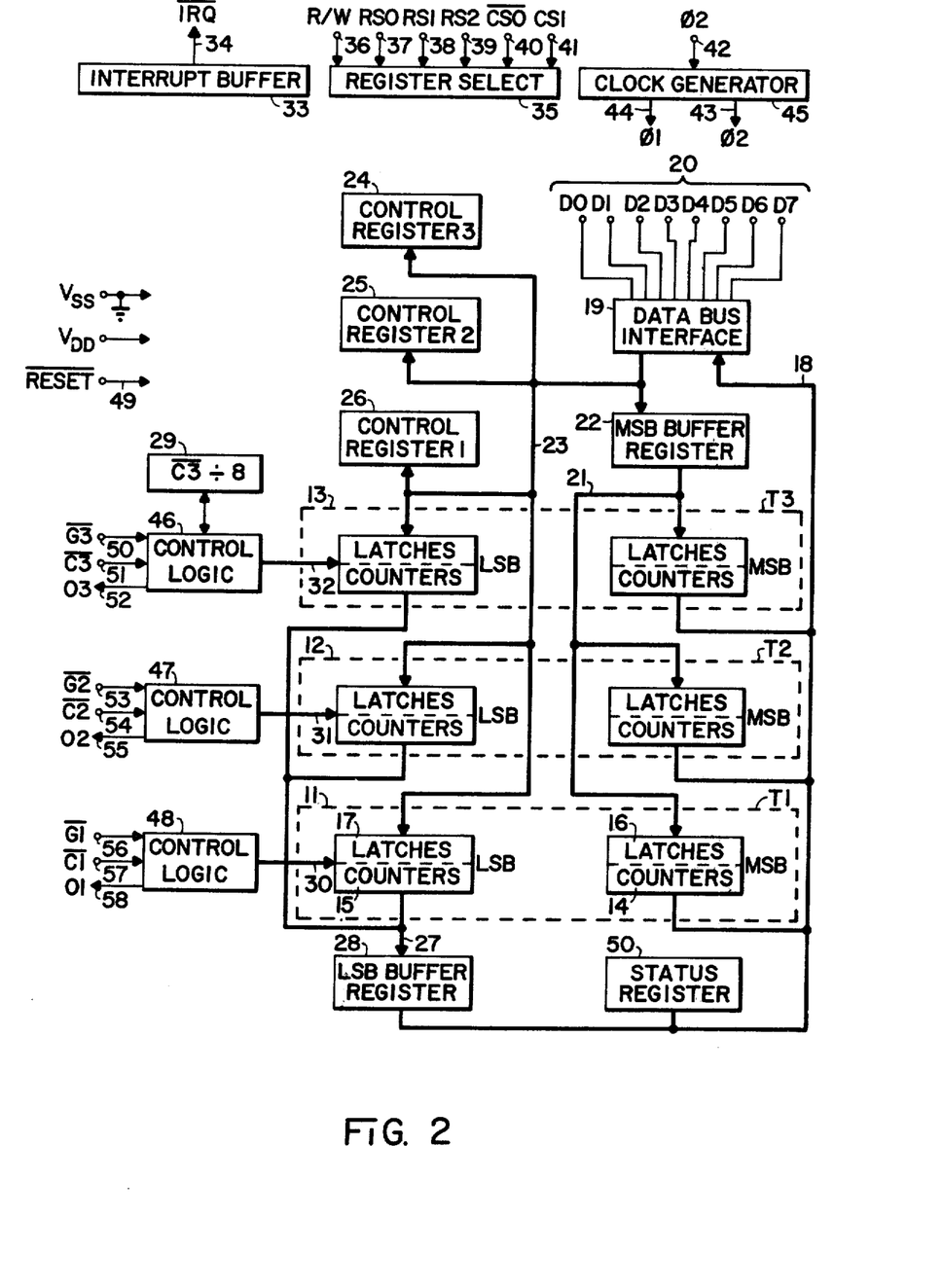
FIG. 2 is a block diagram of a programmable timer module according to the invention.
Figure 3A:
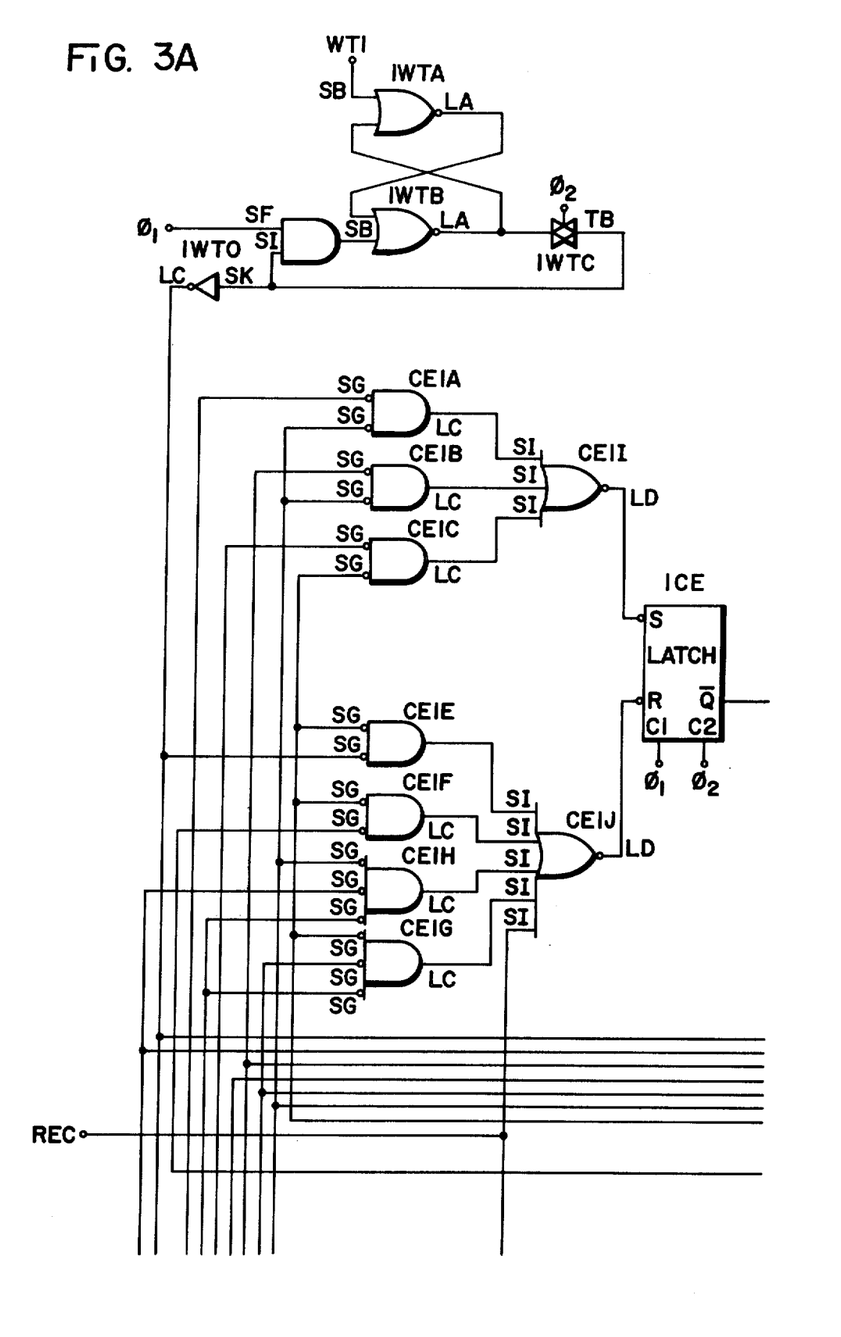
FIG. 3A–3F in combination constitute a detailed logic diagram of circuitry which may be needed to implement the control portions of the block diagram of FIG. 2.
Figure 3B:
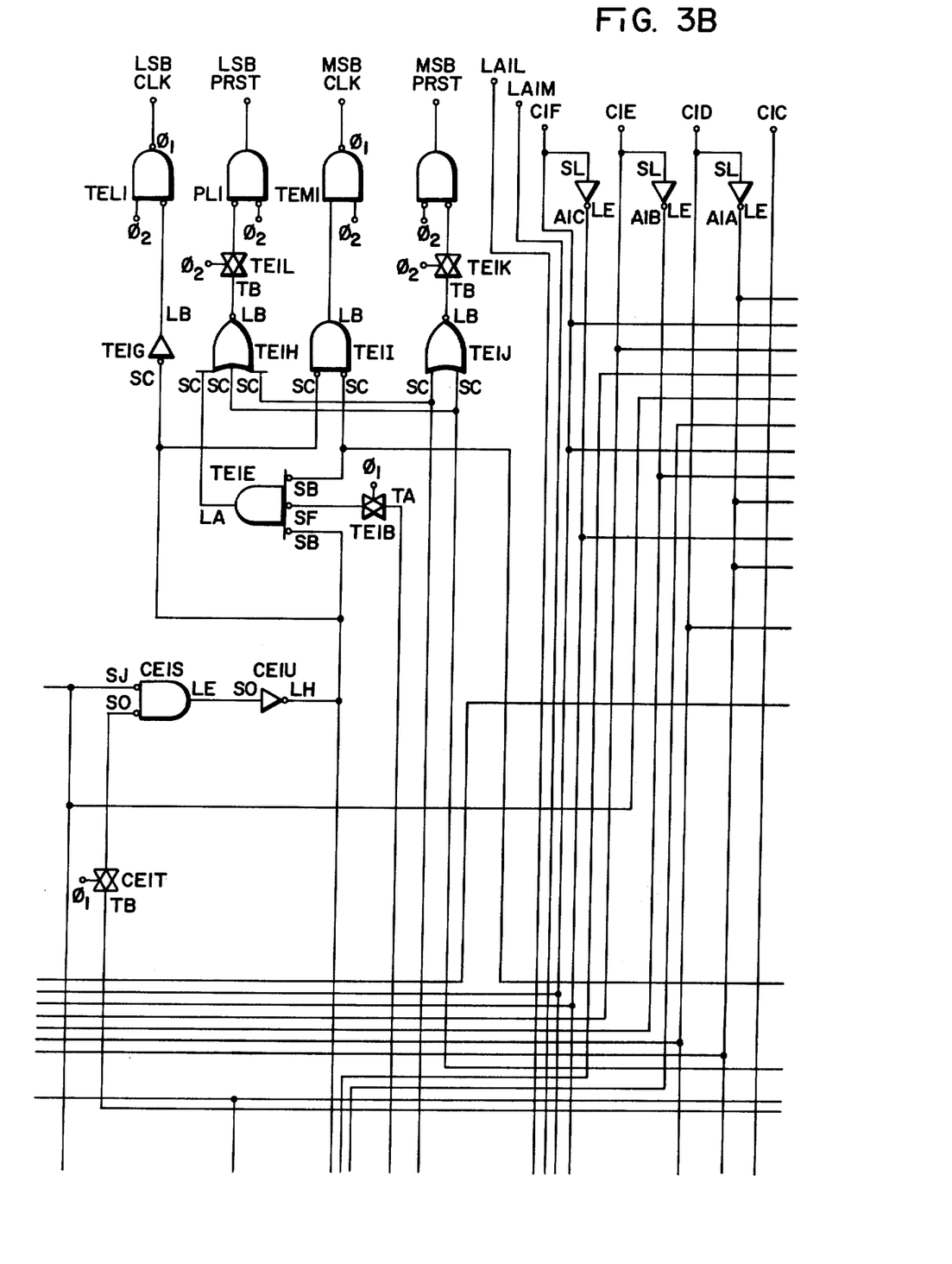
Figure 3C:
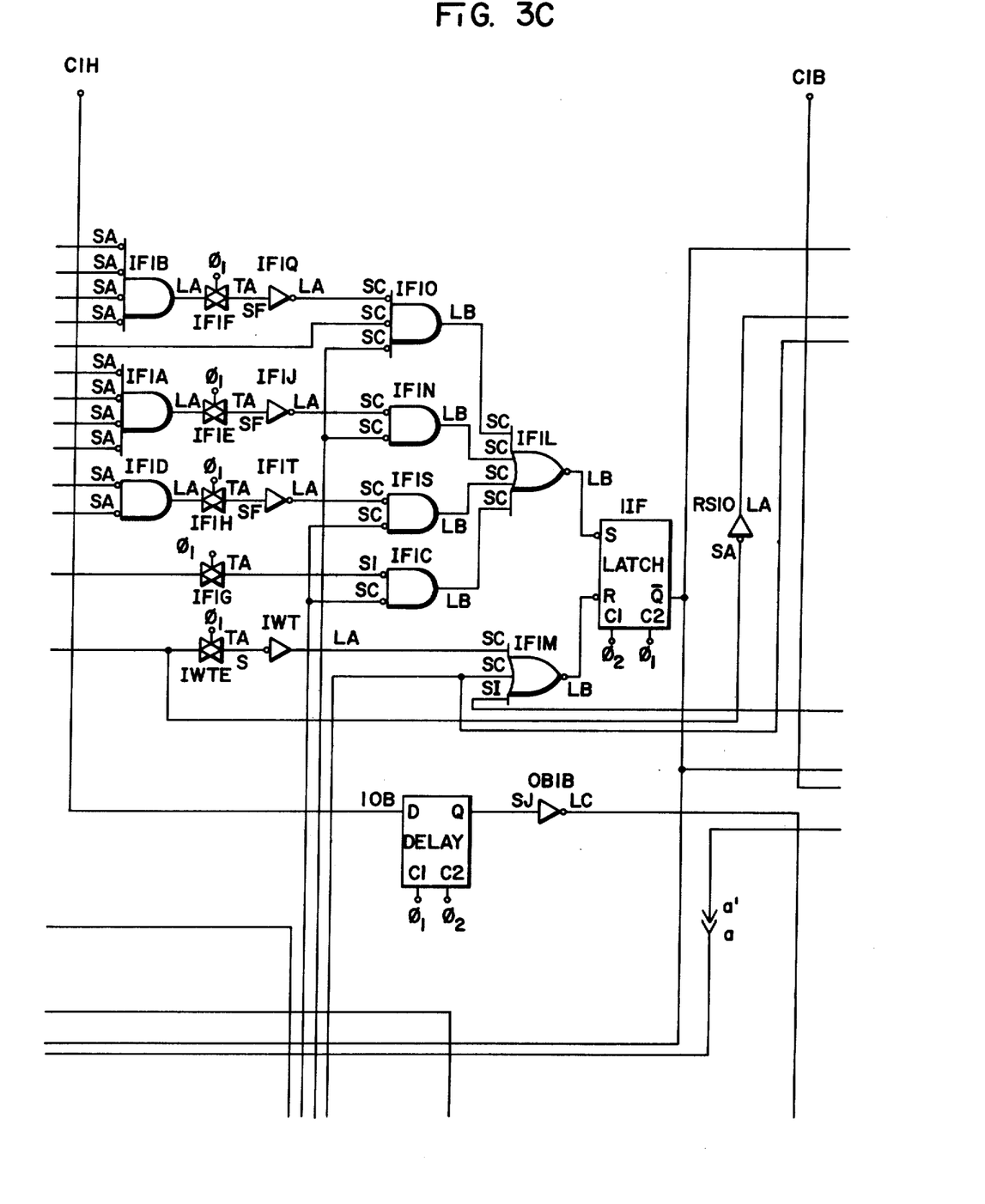
Figure 3D:
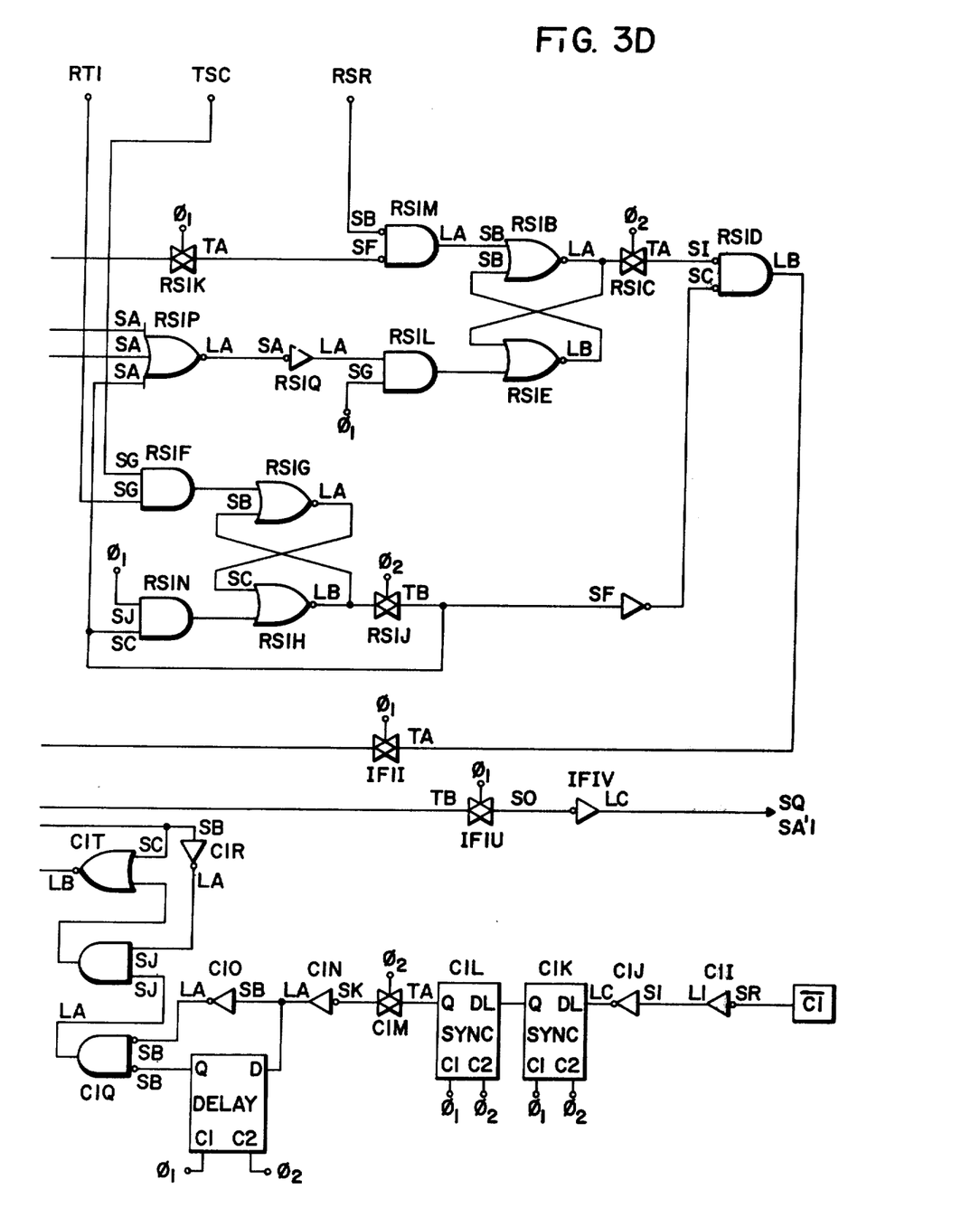
Figure 3E:
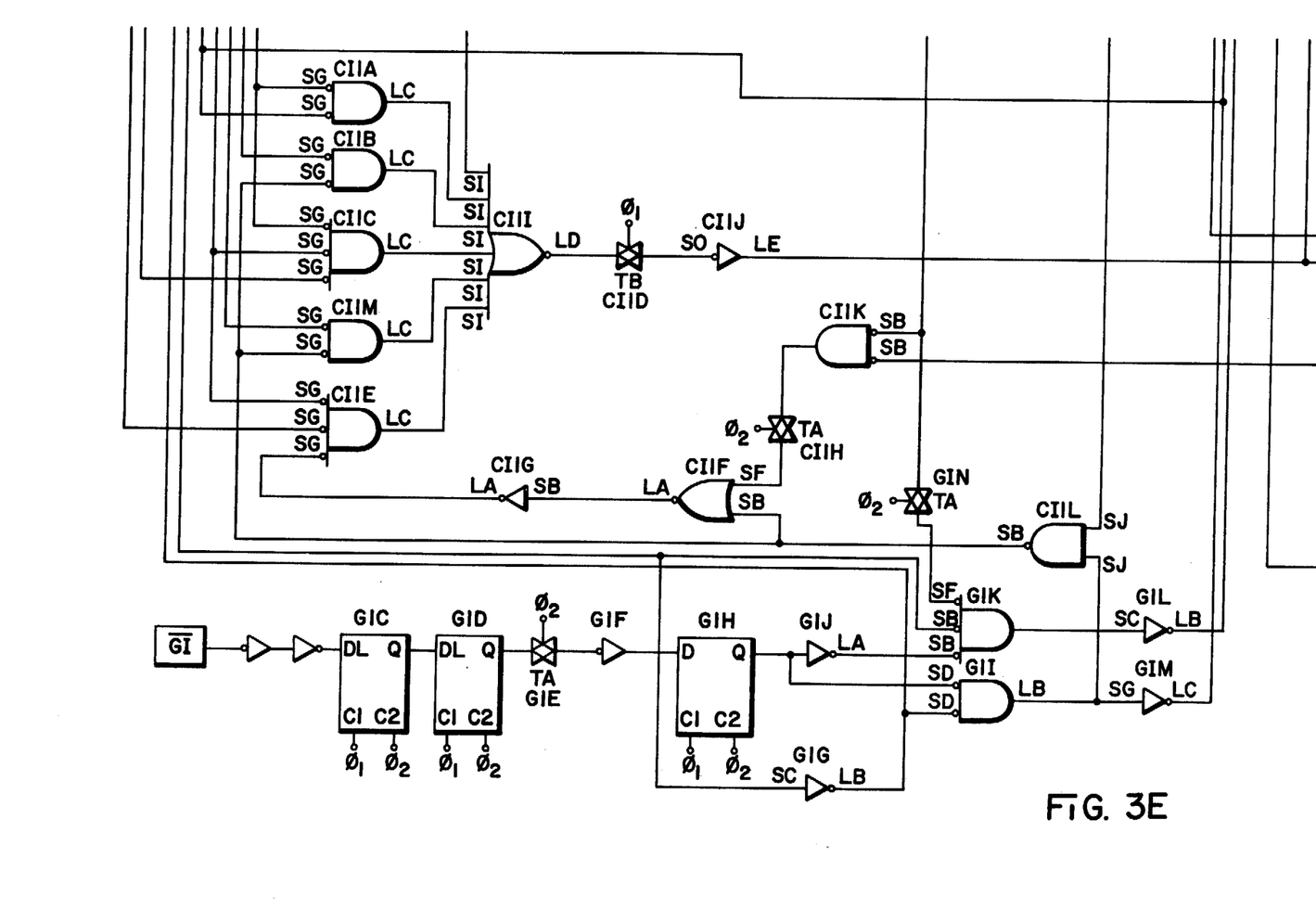
Figure 3F:
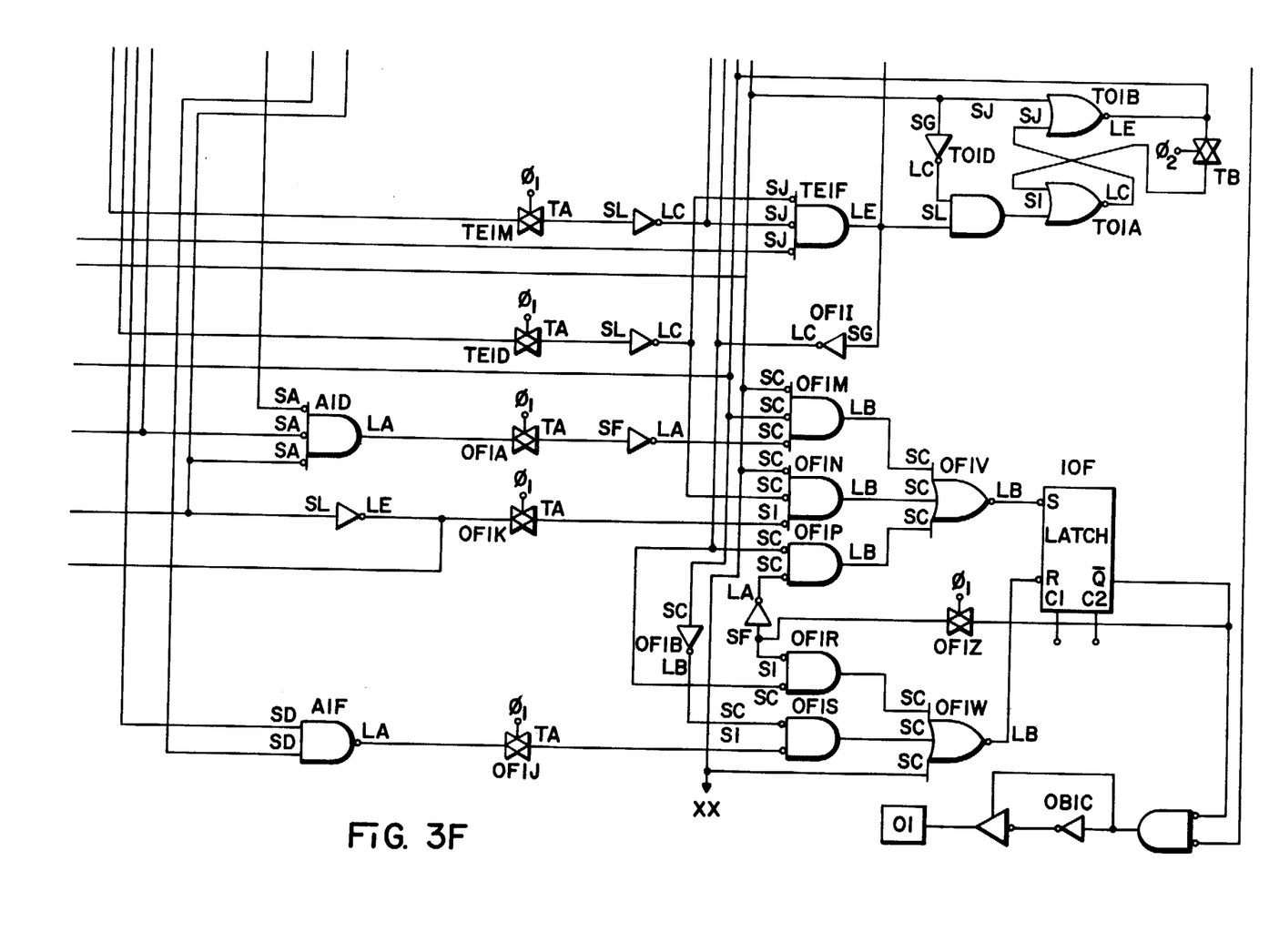

As illustrated in FIG. 2 it is seen that the programmable timer module circuit includes three independent timers 11, 12, and 13, referred to as timers T1, T2, and T3, respectively. Each of the timers 11, 12, and 13 includes a counter portion and a latch portion. In timer 11, counter 14 is an 8 bit counter which constitutes the most significant bit (MSB) counter. MSB counter 14 is directly coupled to MSB latch circuit 16 which includes eight latches. Similarly, least significant bit (LSB) counter 15 is an 8 bit counter which is coupled to 8 bit LSB latch circuit 17. The MSB and LSB counters and latches of timers 12 and 13 are similarly connected. The outputs of each of the MSB counters are coupled to a first 8-bit bus 18, which is also coupled to data bus interface circuit 19 and to LSB buffer register 28 and to 8-bit status register 50. Data bus interface circuit 19 is coupled to conductors $D\phi$ through D7, generally designated by 20, and which constitute the bidirectional data bus conductors of a microprocessor system as shown in FIG. 1.

The outputs of the LSB counters such as 15 are all connected to a second eight conductor bus 27, which is also connected to the inputs of LSB buffer register 28. Thus, the microprocessor system of FIG. 1 can, under appropriate conditions, monitor or read the status of any of the MSB counters, of the status register, or any of the LSB conductors via the LSB buffer register 28.

The MSB latches, such as 16, are all connected to a third 8-bit bus 21, which is connected to the outputs of MSB buffer register 22. The inputs of MSB buffer register 22 are connected to a fourth 8-bit bus 23 which is also coupled to data bus interface circuit 19, as well as to the inputs of control register number 1, (reference numeral 26); control register number 2, (reference numeral 25); and control register number 3, (reference numeral 24). Eight-bit bus 23 is also connected to the inputs of all of the LSB latches of the three timers 11, 12, and 13 such as 17 in timer 11. Thus, all of the latches and the three control registers can be loaded from the external data bus 20 either directly or through MSB buffer register 22. Timer control logic circuitry 48, is connected to timer 11 via bus 30. Similarly, timer control logic circuitry 47 is connected via bus 31 to timer 12 and timer control logic 46 is connected via bus 32 to timer 13. External control of timer 11 is performed via the gate input 56 and the clock input 57 which connect to the input of control logic 48. Timer output signal 58 responsive to timer 11 is connected to the output of the control logic circuitry 48. Likewise, external control of timer 12 is performed via the gate input 53 and the clock input 54 connected to the input of control logic 47. Timer output signal 55 responsive to timer 12 is connected to the output of the control logic 47. Similarly, external control of timer 13 is performed via the gate input 50 and the clock input 51 which connect to the input of control logic 46. Timer output signal 52 responsive to timer 13 is connected to the output of the control logic 46.

The logic diagram shown in FIGS. 3A-3F is a detailed block diagram of a counter control circuit 48 of FIG. 2.

Figure 4:
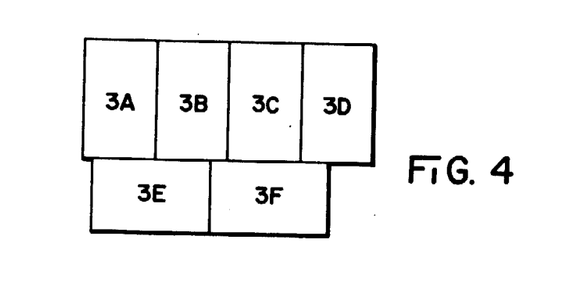
FIG. 4 is a diagram depicting how FIGS. 3A–3F may be pieced together to produce a complete schematic of the control circuitry of the device.
Figure 5:
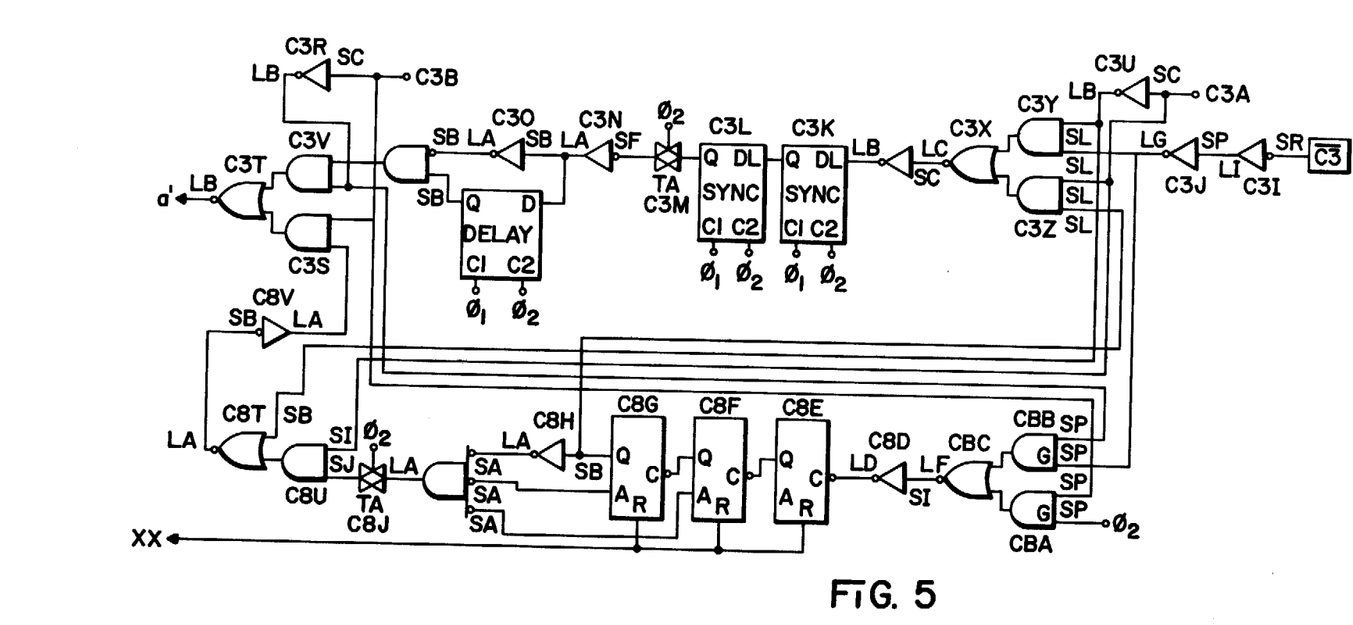
FIG. 5 is a logic diagram setting forth the additional control circuitry required for the control logic of counter 3.

FIG. 4 is a diagram depicting the placement of FIGS. 3A-3F to form a complete logic diagram of a control circuit for timer 1. FIG. 5 shows additional logic used to complete the control logic for timer 3, which is somewhat different than the control circuit for timers 1 and 2.

The PTM is a programmable timer device designed to provide variable system time intervals in a microcomputer system.

The PTM includes three independent general-purpose fully programmable sixteen-bit timing counters 11, 12 and 13, (T1, T2, and T3) which by program control may be used to cause system interrupts and generate output signals. It has special application in the areas of frequency measurement, tachometer or speed detection, pulse width modulation and program controlled generation of square waves, asymmetrical pulses, or single pulses.

The three timers 11, 12, 13 in the PTM 10 may be independently programmed to operate in modes which fit a wide variety of applications. The device is fully bus compatible with M6800 systems and is accessed by load and store operations from the MPU in much the same manner as a memory device. In a typical application, a timer will be loaded by first storing two bytes of data into an associated timer latch. This data is then transferred into the counter via a counter initialization cycle. The counter decrements on each subsequent clock signal negative transition until one of several predetermined conditions causes it to halt or recycle. The timers are thus programmable, cyclic in nature, controllable by external inputs or the MPU program, and accessible by the MPU at any time.

The PTM interfaces to the M6800 bus with an eight-bit bidirectional data bus 20; two chip selected lines 40, 41; a read-write line, 36; an enable or system $\phi2$, 42; an interrupt request line, 34; an external reset line, 49; and three register select lines 37, 38, 39. These signals, in conjunction with the MC6800 VMA output, permit the MPU to control the PTM 10. VMA should be utilized in conjunction with an MPU address line into a chip select line of the PTM 10.

The bidirectional data lines (D$\phi$-D7) 20 allow the transfer of data between the MPU and PTM 10. The data bus output drivers are three state devices which remain in the high-impedance (off) state except when the MPU performs a PTM read operation. (Read-write and enable lines high and PTM chip select lines activated.)

The chip select signals $\overline{CS\phi}$, 40, and CS1, 41, are used to activate the data bus interface, 20, and allow transfer of data from the PTM, 10. With $\overline{CS\phi}=0$ and CS1=1, the device is selected and data transfer will occur.

The read-write line, 36, is generated by the MPU to control the direction of data transfer on the data bus, 20. With the PTM, 10, selected, a low state on the read-write line enables the input buffers and data is transferred from the MPU to the PTM on the trailing edge of the enable signal, 42. Under the same condition but with the read-write line equal to 1, the MPU can read the data in the PTM.

Enable signal, or system $\phi2$, 42, synchronizes data transfer between the MPU and the PTM. It also performs an equivalent synchronization function on the external clock, reset and gate inputs of the PTM.

The active low interrupt request signal, 34, is normally tied directly to the $\overline{IRQ}$ input of the MPU. This output has no load device on the chip which permits other similar interrupt request lines to be tied together in a wired-OR configuration. The $\overline{IRQ}$ line is activated if and only if the composite interrupt flag, bit 7 of the internal status register, is asserted.

Recognition of a low level on the external reset line, 49, will cause the PTM, 10, to go into a reset state. A low level on external reset is clocked into the PTM by the enable signal, 42. Two enable pulses are required to synchronize and process the reset signal. The PTM recognizes the active low state or the inactive high state on the third enable pulse. If the external reset signal is asynchronous an additional enable period is required if setup times are not met. Recognition of a low level external reset signal will cause (a) all counter latches to preset to their maximal count values, (b) all control registers are cleared with exception of bit CR10 which is set, (c) all counters are preset to the contents of the latches, (d) all counter outputs are reset and all counter clocks are disabled, and (e) all interrupt flags and status register bits are cleared.

The register select lines RS$\phi$, 37; RS1, 38; RS2, 39; are used in conjunction with the read-write 36, to select the internal registers, counters and latches as shown in the following table:

| REGISTER SELECT INPUTS | | | OPERATIONS | |
|---|---|---|---|---|
| RS2 | RS1 | RS0 | R/W = 0 | R/W = 1 |
| 0 | 0 | 0 | CR20 = 0 WRITE CONTROL REGISTER #3 | NO OPERATION |
|   |   |   | CR20 = 1 WRITE CONTROL REGISTER #1 |   |
| 0 | 0 | 1 | WRITE CONTROL REGISTER #2 | READ STATUS REGISTER |
| 0 | 1 | 0 | WRITE MSB BUFFER REGISTER | READ TIMER #1 COUNTER |
| 0 | 1 | 1 | WRITE TIMER #1 LATCHES | READ LSB BUFFER REGISTER |
| 1 | 0 | 0 | WRITE MSB BUFFER REGISTER | READ TIMER #2 COUNTER |
| 1 | 0 | 1 | WRITE TIMER #2 LATCHES | READ LSB BUFFER REGISTER |
| 1 | 1 | 0 | WRITE MSB BUFFER REGISTER | READ TIMER #3 COUNTER |
| 1 | 1 | 1 | WRITE TIMER #3 LATCHES | READ LSB BUFFER REGISTER |

Three write only control registers, 24, 25, and 26 are used to modify timer operation to suit a variety of applications. Control register 2 designated as numeral 25 in FIG. 2 has a unique address space and may be written into at any time. The other two control registers, 24 and 26 share a common register select address space. The least significant bit of control register 2, (CR20) is used as an additional addressing bit for control register 1 and 3. See the following table:

| CR10 Internal Reset Bit | | CR20 Control Register Address Bit | | CR30 Timer #3 Clock Control | |
|---|---|---|---|---|---|
| 0 | All timers allowed to operate | 0 | CR#3 may be written | 0 | T3 $\overline{\text{Clock}}$ is not prescaled |
| 1 | All timers held in preset state | 1 | CR#1 may be written | 1 | T3 $\overline{\text{Clock}}$ is prescaled by ÷8 |
| CRX1 | | Timer #X $\overline{\text{Clock}}$ Source | | | |
| 0 | | TX uses external clock source on $\overline{\text{CX}}$ input | | | |
| 1 | | TX uses Enable clock | | | |
| CRX2 | | Timer #X Counting Mode Control | | | |
| 0 | | TX configured for normal (16-bit) counting mode | | | |
| 1 | | TX configured for dual 8 bit counting mode | | | |
| CRX3 CRX4 CRX5 | | Timer #X Counter Mode and Interrupt Control (See next table) | | | |
| CRX6 | | Timer #X Interrupt Enable | | | |
| 0 | | Interrupt Flag masked on $\overline{\text{IRQ}}$ | | | |
| 1 | | Interrupt Flag enabled to $\overline{\text{IRQ}}$ | | | |
| CRX7 | | Timer #X Counter Output Enable | | | |
| 0 | | TX output masked on output OX | | | |
| 1 | | TX Output enabled on output OX | | | |

The least significant bit of control register 1 (CR10) is used as an internal reset bit. When this bit is a logic zero, all timers are allowed to operate in the modes prescribed by the remaining bits of the control registers. Writing a "one" into CR10 causes all counters to be preset with the contents of the corresponding counter latches, all counter clocks to be disabled, and the timer outputs and interrupt flags to be reset. Counter latches and control registers are undisturbed by CR10 and may be written into.

The least significant bit of control register 3 is used as a selector for a ÷8 prescaler which is available with timer 3 only. The prescaler, 29, if selected is effectively placed between the clock input circuitry and the timer 3 control logic. The prescaler can be used with either an internal $\phi$2 clock 43, which comes from the enable input, 42, through the clock generator, 45, or an external clock source which may be operated at a frequency as high as 4 times the system clock rate.

The least significant bits of the three control registers are unique in that each selects a different function. The remaining bits of each control register select common functions, with a particular control register affecting only its corresponding timer.

Bit 1 of control register 1 (CR11) selects whether an internal or external clock source is to be used with timer 1. Similarly, CR21 selects the clock source for timer 2 and CR31 performs this function for timer 3. The function of each bit of control register "X" can be defined as shown in the remaining section of the proceeding table.

Control register bit 2 selects whether the binary information contained in the counter latches is to be treated as a single 16-bit word or two 8-bit bytes. In the single 16 bit counter mode (CR×2=0) the counter will decrement to zero after N+1 enabled negative going clock transitions ($\overline{G}$=0) where N is defined as the 16-bit number in the counter latches. With CR×2=1 a similar time out will occur after (L+1)·(M+1) enabled negative going clock transitions, where L and M, respectively, refer to the least significant bit and most significant bit bytes in the counter latches.

Control register bits 3, 4, and 5 are explained in detail in the paragraphs on the timer operating modes. Bit 6 is an interrupt mask bit which will be explained more fully in conjunction with the status register, and bit 7 is used to enable the corresponding timer output.

The read-only status register indicated as item 50 in FIG. 2 contains four interrupt flag bits. The remaining four bits of the register are not used and default to zeros when read. Bits 0, 1 and 2 are assigned to timers 1 (11), timer 2 (12), and timer 3 (13) respectively as interrupt flag bits, while bit 7 is a composite interrupt flag. This flag bit will be asserted if any of the individual flag bits are set while bit 6 of the corresponding control register is a logic one. The conditions for asserting the composite interrupt flag bit can be expressed as:

INT = I1·CR16 + I2·CR26 + I3·CR36.

where INT is the composite interrupt flag, bit 7, I1 is the timer 1 interrupt flag, bit $\phi$, I2 is the timer 2 interrupt flag, bit 1, I3 is the timer 3 interrupt flag, bit 2.

An interrupt flag is cleared by a timer reset condition. It will also be cleared by a read timer counter command provided that the status register has previously been read while the interrupt flag was set. This condition on the read status register then read timer counter (RS-RT) sequence is designed to prevent missing interrupts which might occur after the status register is read, but prior to reading the timer counter.

An individual interrupt flag is also cleared by a write timer latches (W) command or a counter initialization (CI) sequence, provided that W or CI affects the timer corresponding to the individual interrupt flag.

Each of the three independent timers consists of a 16 bit addressable counter and 16 bits of addressable latches. Since the data bus is only 8 bits wide and the counters are 16 bits wide, a temporary register for the most significant byte, the MSB buffer register, 22, is provided. The MSB buffer register is a write only register. Three addresses are provided for the MSB buffer register. Data from the MSB buffer register is transferred to the most significant byte of timer X when a write timer X latches command is performed. This allows the transfer of two bytes of data into the counter latches provided that the MSB is transferred first.

A logical zero at the reset input initializes the counter latches to a maximum count of $65,536_{10}$. Bit zero of control register 1 has no effect on the counter latches.

Counter initialization is defined as the transfer of data flow from the latches to the counter with subsequent clearing of the individual interrupt flag associated with the counter. Counter initialization always occurs when a reset condition is recognized. It can also occur with a write timer latches command or recognition of a negative transition of the gate input signal.

Counter recycling or re-initialization occurs when a negative transition of the clock input signal is recognized after the counter has reached an all zero state. In this case, data is transferred from the latches to the counter.

Each of the three timers within the PTM has external clock and gate inputs as well as a counter output line. The inputs are high impedance, TTL compatible lines and outputs are capable of driving two standard TTL loads.

Clock input signal lines $\overline{C1}$, 57; $\overline{C2}$, 54; $\overline{C3}$, 51; will accept asynchronous TTL voltage level signals to decrement timer 1, timer 2 and timer 3 respectively. The high and low level of the external clocks must be stable for at least one system clock period plus the sum of the setup and hold times for the inputs. The asynchronous clock rate can vary from DC to the limit imposed by the enable input signal, setup, and hold times.

The external clock inputs are clocked in by enable signal pulses. Three enable periods are used to synchronize and process the external clock. The fourth enable pulse decrements the internal counter. This does not affect the input frequency, it merely creates a delay between a clock input transition and internal recognition of that transition by the respective counter. All references to $\overline{C}$ inputs refer to the internal recognition of the input transition at its respective counter. A clock level which does not meet setup and hold time specifications may require an additional enable pulse for recognition. When observing reoccurring events, a lack of synchronization may be apparent. This lack of synchronization is known as "jitter" and is commonly observed on outputs when using asynchronous inputs. There are two types of jitter. "System jitter" is the result of the input signals being out of snychronization with the enable input signal, permitting signals with marginal setup and hold times to be recognized by either the time nearest the input transition or the subsequent bit time. "Input jitter" can be as great as the time between input signal negative going transitions plus the system jitter, if the first transition is recognized during one system cycle and not recognized the next cycle, or vice versa.

External clock input line $\overline{C3}$, 51, represents a special case when timer 3 is programmed to utilize its optional $\div 8$ prescaler mode. The maximum input frequency may be as high as 4 times the enable signal. The output of the $\div 8$ prescaler is treated in the same manner as the previously discussed clock inputs. It is clocked into the counter by enable pulses, is recognized on the fourth enable pulse provided setup and hold times requirements are met, and must produce an output pulse at least as wide as the sum of an enable period, setup and hold timer.

Gate input signals $\overline{G1}$, 56; $\overline{G2}$, 54; $\overline{G3}$, 50; accept asynchronous TTL compatible signals which are used as a trigger or clock gating function to timers 1, 2 and 3 respectively. The gating inputs are clocked into the PTM by the enable input signal in the same manner as the clock input signals. A gate transition is recognized by a counter on the fourth enable pulse provided setup and hold time requirements are met. All references to $\overline{G}$ transitions relate to internal recognition of the input transition at its corresponding counter.

The gate input signals of all timers directly affect the respective counter.

Timer outputs 01, 02, and 03, lines 58, 55, and 52 respectively, are capable of driving up to two TTL loads and produce a defined output waveform for either continuous or single shot timer modes. Output waveform definition is accomplished by selecting either single 16 bit or dual 8-bit operating modes. The single 16 bit mode will produce a square wave output in the continuous timer mode and will produce a single pulse in the single shot timer mode. The dual 8-bit mode will produce a pulse of varying duty cycle in both the continuous and single shot timer modes. One bit of each control register (CR×7) is used to enable the corresponding output. If this bit is cleared the output will remain low regardless of the operating mode.

The continuous and single shot timer modes are the only ones for which output response is defined. Signals appear at the outputs if CR×7=1 during frequency and pulse width comparison modes, but the actual waveform is not predictable in typical applications.

Control register bits CR×3, CR×4 and CR×5 define the different operating modes of the timers. These modes are outlined in the following table:

| CONTROL REGISTER | | | |
|---|---|---|---|
| CRX3 | CRX4 | CRX5 | TIMER OPERATING MODE |
| 0 | * | 0 | CONTINUOUS |
| 0 | * | 1 | SINGLE-SHOT |
| 1 | 0 | * | FREQUENCY COMPARISON |
| 1 | 1 | * | PULSE WIDTH COMPARISON |

* DEFINES ADDITIONAL TIMER FUNCTIONS

In addition to the four timer modes in the above table the remaining control register bit, CR×2, is used to modify counter initialization and enabling or interrupt conditions.

Any of the timers in the PTM may be programmed to operate in a continuous mode by writing zeros into bits 3 and 5 of the corresponding control register. Assuming that the timer output is enabled (CR×7=1) either a square wave or a variable duty cycle waveform will be generated at the timer output OX. The type of output is selected via control register bit CR×2.

Either a timer reset (CR10=1 or external reset=0) condition or internal recognition of a negative transition of the gate input signal results in a counter initialization. A write timer latches command can be selected as a counter initialization signal by clearing CR×4.

In the dual 8-bit mode (CR×2=1) the MSB decrements once for every time out of the LSB counter. The output, if enabled remains low during and after counter initialization and will remain low until the contents of the MSB counter is all zeros. The output will go high at the beginning of the next clock transition. The output remains high until the timer times out. The timer has timed out when both the LSB and the MSB timers time out simultaneously. At the timer time out the output goes low.

In the normal 16-bit mode the output, if enabled, toggles at each timer time out. The output, if enabled, will go low at a counter initialization. The counter output is unaffected by counter reinitialization.

The counter is enabled by an absence of a timer reset condition and a logic zero at the gate input line. The counter will then decrement on the first clock transition recognized during or after the counter initialization cycle. It continues to decrement on each clock signal so long as the gate input signal remains low and no reset condition exists. A counter time out is defined by the first clock after all counter bits equal zero. When the timer times out the interrupt flag is set and the counter is reinitialized.

A special condition exists for the dual 8 bit mode if the LSB latches are set to zero. In this case the counter will revert to a mode similar to the 16 bit mode except that the time out will occur after M+1 clock pulses. The output, if enabled, goes low during counter initialization and toggles at each timer time out.

If the MSB and the LSB latches are both set equal to zero the output of the counter will toggle at a rate equal to one half the clock frequency.

The timers will operate in the same manner regardless of the state of CR×6 or CR×7.

G↓ = Negative transition of GATE input.
W = Write Timer Latches Command.
R = Timer Reset (CR10=1 or External RESET=0)
N = 16 Bit Number in Counter Latch.
L = 8 Bit Number in LSB Counter Latch.
M = 8 Bit Number in MSB Counter Latch.
T = Clock Input Negative Transitions to Counter
to = Counter Initialization Cycle.
T.O. = Counter Time Out (All Zero Condition).
* All time intervals shown above assume that the Gate (G) and Clock (C) signals are synchronized to enable (system $\phi_2$) with the specified setup and hold time requirements.

The single shot timer mode is identical to the continuous mode with three exceptions: (a) the output returns to a low level after the first time out and remains low until another counter initialization cycle occur, (b) the internal counter enable is not dependent on the gate input signal remaining in the low state, (c) setting of the counter latches will disable the output.

| SINGLE-SHOT MODE (CRX3=0, CRX5=1) | | | |
|---|---|---|---|
| CONTROL REGISTER | | INITIALIZATION/OUTPUT WAVEFORMS | |
| CRX2 | CRX4 | COUNTER INITIALIZATION | TIMER OUTPUT (OX) (CRX7=1) |
| 0 | 0 | $\overline{G}\downarrow \cdot W+R$ | |
| 0 | 1 | $\overline{G}\downarrow +R$ |  |
| 1 | 0 | $\overline{G}\downarrow \cdot W+R$ | |
| 1 | 1 | $\overline{G}\downarrow +R$ | |

Symbols are as defined in the previous table.

The time interval modes are provided for those applications which require more flexibility of interrupt generation and counter initialization. Individual interrupt flags are set in these modes as a function of both counter time out and transitions of the gate input signals. Counter initialization is affected by interrupt flag status.

The output signal is not defined in any of these modes, but the counter does operate in either the single 16 bit or dual 8 bit modes as programmed by CRX2.

Two frequency comparison modes are provided. When CRX3=1, CRX4=0, CRX5=1 and time out occurs prior to the first negative transition of the gate input signal after a counter initialization cycle, an individual interrupt flag is set. The counter is disabled and a counter initialization cycle can not begin until the interrupt flag is cleared and a negative transition on the gate input signal is detected.

Any of the timers within the PTM may be programmed to compare the period of a pulse, giving the frequency after calculations, at the gate input line with the time period required for a timer time out. A negative transition of the gate input signal enables the counter and starts a counter initialization cycle provided that the other conditions noted in the table below are satisfied. The counter decrements on each clock input signal recognized during or after counter initialization until an interrupt is generated, a write timer latches command is issued or a timer reset condition occurs. If CRX5=0 an interrupt will be generated if the period of the pulse at the gate input line is less that of the timer time period. If CRX5=1 an interrupt is generated if the period of the pulse at the gate input line is greater than the timer time out period. If a counter initialization has occurred and the gate input signal has returned low prior to the timer

| CRX3 = 1 | | | |
|---|---|---|---|
| CRX4 | CRX5 | APPLICATION | CONDITION FOR SETTING INDIVIDUAL INTERRUPT FLAG |
| 0 | 0 | FREQUENCY COMPARISON | INTERRUPT GENERATED IF $\overline{GATE}$ INPUT PERIOD ($^1$/F) IS LESS THAN COUNTER TIME OUT (T.O.) |
| 0 | 1 | FREQUENCY COMPARISON | INTERRUPT GENERATED IF $\overline{GATE}$ INPUT PERIOD ($^1$/F) IS GREATER THAN COUNTER TIME OUT (T.O.). |
| 1 | 0 | PULSE WIDTH COMPARISON | INTERRUPT GENERATED IF $\overline{GATE}$ INPUT "DOWN TIME" IS LESS THAN COUNTER TIME OUT (T.O.) |
| 1 | 1 | PULSE WIDTH COMPARISON | INTERRUPT GENERATED IF $\overline{GATE}$ INPUT "DOWN TIME" IS GREATER THAN COUNTER TIME OUT (T.O.). |

If CRX3=1, CRX4=0, CRX5=0 an interrupt is generated if the gate input signal returns low prior to a time out. If the timer time out occurs first, the counter is recycled and continues to decrement. A bit is set within the timer on the initial time out which precludes further individual interrupt generation until a new time out, no individual interrupt flag will be generated and a new counter initialization cycle will start. The process will continue with frequency comparison being performed on each gate input cycle until the mode is changed, or a cycle is determined to be above predetermined limits.

| CRX3=1, CRX4=0 FREQUENCY COMPARISON MODE | | | | |
|---|---|---|---|---|
| CONTROL REG BIT 5 (CRX5) | COUNTER INITIALIZATION | COUNTER ENABLE FLIP-FLOP SET (CE) | COUNTER ENABLE FLIP-FLOP RESET (CE) | INTERRUPT FLAG SET (I) |
| 0 | $\overline{G}\downarrow \cdot \overline{T} \cdot (\overline{CE}+TO \cdot CE)+R$ | $\overline{G}\downarrow \cdot W \cdot \overline{R} \cdot \overline{T}$ | $W+R+I$ | $\overline{G}\downarrow$ BEFORE T.O. |
| 1 | $\overline{G}\downarrow \cdot \overline{T}+R$ | $\overline{G}\downarrow \cdot W \cdot \overline{R} \cdot \overline{T}$ | $W+R+I$ | T.O. BEFORE $\overline{G}\downarrow$ | counter initialization cycle has been completed. When this internal bit is set, a negative transition of the gate input signal starts a new counter initialization cycle.

The pulse width comparison mode is similar to the frequency comparison mode except for a positive rather than negative transition of the gate input signal terminates the count. If CR×3=1, CR×4=0 an individual interrupt flag will be generated if the zero level pulse applied to the gate input signal is less than the time period required for a timer time out. If CR×5=1, the interrupt is generated when the reverse is true.

It can be seen in the table below that a positive transition of the gate input signal disables the counter. With CR×5=0, it is possible to directly obtain the width of any pulse causing an interrupt. Similar data for other time interval modes and conditions can be obtained, if two sections of the PTM are dedicated to that purpose.

|  | CRX3=1, | CRX4=1 | PULSE WIDTH COMPARISON MODE | |
|---|---|---|---|---|
| CONTROL REG BIT 5 (CRX5) | COUNTER INITIALIZATION | COUNTER ENABLE FLIP-FLOP SET (CE) | COUNTER ENABLE FLIP-FLOP RESET (CE) | INTERRUPT FLAG SET (I) |
| 0 | $\overline{G}\downarrow \cdot \overline{T} + R$ | $\overline{G}\downarrow \cdot \overline{W}\cdot\overline{R}\cdot\overline{T}$ | $W + R + I + G$ | $\overline{G}\uparrow$ BEFORE T.O. |
| 1 | $\overline{G}\downarrow \cdot T + R$ | $\overline{G}\downarrow \cdot \overline{W}\cdot\overline{R}\cdot T$ | $W + R + I + G$ | T.O. BEFORE $\overline{G}\uparrow$ |

Figure 6:
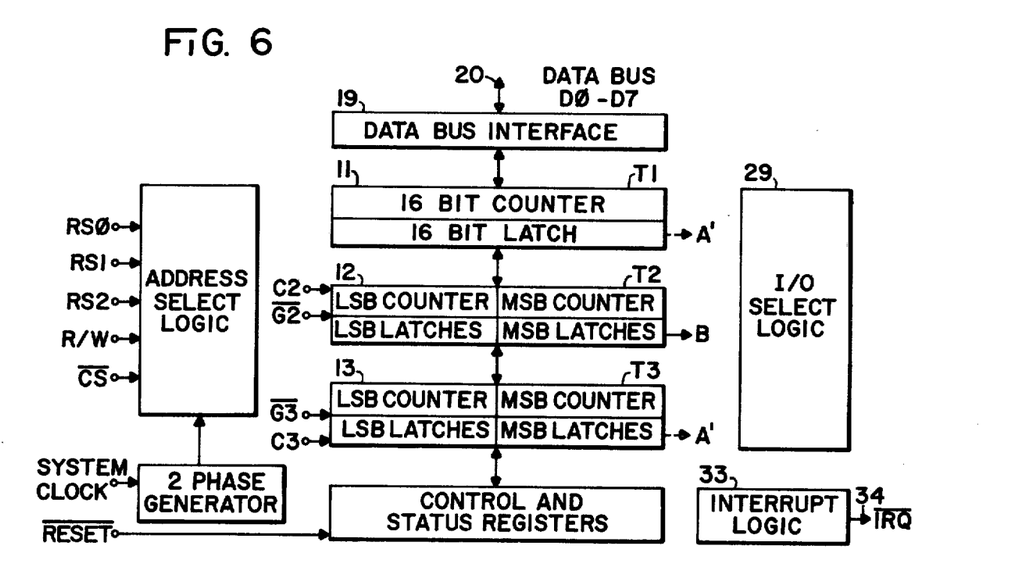
FIG. 6 is a block diagram of an alternate embodiment of a programmable timer module according to the invention.

FIG. 6 is a block diagram of an alternative embodiment of a PTM according to the invention. This embodiment of the PTM differs from that in FIG. 2 in that there is no MSB buffer register and no LSB buffer register. Consequently an 8-bit data bus must address the 16-bit timer directly on two separate cycles. Additionally, the counters of this embodiment are incrementers. The counters are reset at the start of a count and a match is obtained to set an interrupt flag when the count in the counters matches the count in the associated latch.

What is claimed is:

1. A programmable timer device for use within a digital processing system and coupleable to a data bus of said system and responsive to a clock signal, comprising:
   latch means responsive to signals on said data bus for receiving and storing a first binary number from said data bus;
   counter means responsive to said clock signal coupled to said latch means and to said data bus for counting at a rate determined by said clock signal;
   first means coupled to said latch means and said counter means for generating a signal for interrupting the operation of the system in response to a matching between the contents of said counter means and said first binary number;
   status storage means responsive to said first means coupled to said data bus for storing information indicative of the occurrence of said interrupt signal; for receiving selection signals;
   selection means responsive to said selection signals coupled to said latch mean, said counter means, and said status storage means for selectively and operatively coupling a one of said latch means, said status storage means, and said counter means to said data bus.

2. The programmable timer device as recited in claim 1 further comprising:
   a read-write input for receiving a read-write signal;
   read-write means responsive to said read-write signal coupled to said latch means and to said status storage means for enabling transfer of said first binary number from said data bus to said latch means during a write cycle.

3. The programmable timer device as recited in claim 2 wherein said read-write means further includes means responsive to said read-write signal coupled to said data bus and to said counter means for effecting transfer of contents of said counter means to said data bus during a write cycle.

4. The programmable timer device as recited in claim 2 further comprising means responsive to said latch means and to said counter means for resetting said counter means in response to a matching between the contents of said counter means and said first binary number.

5. The programmable timer device as recited in claim 4 further comprising:
   control storage means responsive to said data bus for storing control information received from said data bus;
   interrupt means responsive to said control storage means and to said interrupt signal for producing an interrupt output signal in response to said interrupt signal conditioned upon the presence of said control information in said control storage means.

6. The programmable timer device as recited in claim 5 further comprising:
   an output;
   output means responsive to said counter means and to said output for conditionally causing an output voltage on said output to toggle in response to the time out of said counter means of said first binary number, conditioned on information in said control storage means.

7. The programmable timer device as recited in claim 4 further comprising means responsive to said read-write input for resetting said counter means in response to a write signal applied to said read-write input.

8. A programmable timer device for use within a digital processing system and responsive to a clock signal and coupleable to a data bus of said system, comprising:
   first latch means responsive to said data bus for receiving and storing a first binary number from said data bus;
   second latch means responsive to said data bus for receiving and storing a second binary number from said data bus;
   first counter means responsive to said clock signal for counting at a rate determined by said clock signal;
   second counter means responsive to said first counter means for counting at a rate determined by said first counter means;
   first means responsive to said first latch means and to said first counter means for resetting said first counter means in response to a match between the contents of said first counter means and said first binary number;
   second means responsive to said second counter means and to said second latch means for resetting said second counter means in response to a matching of the contents of said second counter means with said second binary number;
   third means responsive to said first counter means for incrementing or decrementing said second counter means in response to said matching between the contents of said first counter means and said first binary number;

fourth means responsive to said second counter means and to said second latch means for generating a signal for interrupting the operation of the system in response to said matching between the contents of said second counter means and said second binary number.

9. The programmable timer device are recited in claim 8 further comprising:

an output;

output means responsive to said first counter means and to said second counter means coupled to said output for causing an output voltage on said output to toggle in one direction in response to a matching between the contents of said first counter means and said first binary number and to toggle in an opposite direction in response to the combination of a matching between the contents of said first counter means and said first binary number and said second counter means and said second binary number.

* * * * *